United States Patent [19]

Romagnolo

[11] 4,035,888
[45] July 19, 1977

[54] DETACHABLE CUTTING PLATE FOR DESCALING ROUND BARS ON A CENTERLESS MACHINE

[75] Inventor: Gerard Romagnolo, Eybens, France
[73] Assignee: Ugine Carbone, Grenoble, France
[21] Appl. No.: 712,055
[22] Filed: Aug. 6, 1976
[30] Foreign Application Priority Data
   Sept. 12, 1975   France .................................. 75.28886
[51] Int. Cl.² .............................................. B26D 1/00
[52] U.S. Cl. .................................................. 29/95 R
[58] Field of Search .................. 29/95 R, 95 A, 95 B, 29/95 C, 96

[56] References Cited
   U.S. PATENT DOCUMENTS

| | | | |
|---|---|---|---|
| 3,271,842 | 9/1966 | Brevning | 29/96 |
| 3,314,126 | 4/1967 | Stier | 29/96 |
| 3,557,416 | 1/1971 | Jones | 29/95 R |
| 3,777,341 | 12/1973 | Faber | 29/95 R |
| 3,802,041 | 4/1974 | Swann | 29/96 |
| 3,815,194 | 6/1974 | Gofke | 29/96 |

Primary Examiner—Harrison L. Hinson
Attorney, Agent, or Firm—Dennison, Dennison, Meserole & Pollack

[57] ABSTRACT

A detachable cutting plate which is of polygonal, equilateral, but not equiangular, shape and designed for centerless descaling of rough-drawn or rough-rolled materials, by radial mounting on a rotary multi-tool head, characterized in that it comprises along each main cutting edge two adjoining chip-breaking surfaces consisting of separate concave grooves; (a) the first facing the straight part of the main cutting edge, of which the axis directing the surface is parallel with the said edge and forming a cutting angle $\alpha_1$; (b) the second facing the curved part of the edge connecting the main cutting edge to the secondary planing edge having a directing axis perpendicular to the plane bisecting the curved cutting part and forming a cutting angle $\alpha_2$.

13 Claims, 7 Drawing Figures

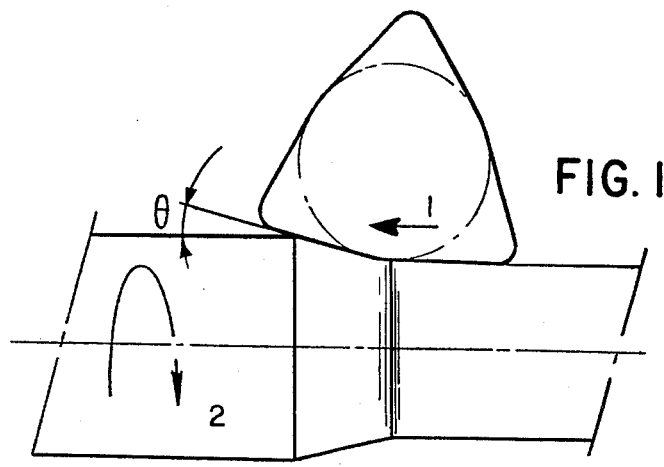
FIG. 1
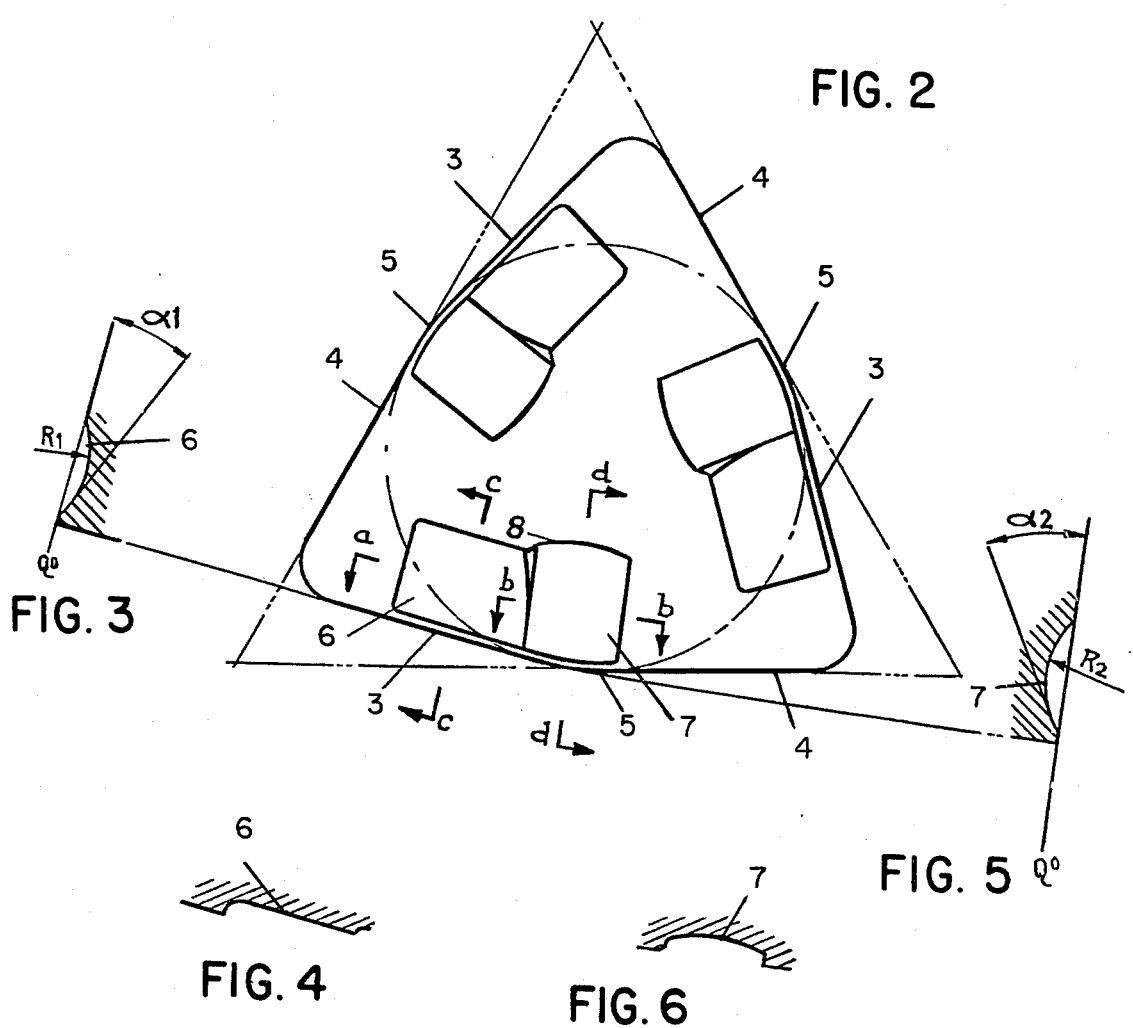
FIG. 2
FIG. 3
FIG. 4
FIG. 5
FIG. 6

DETACHABLE CUTTING PLATE FOR DESCALING ROUND BARS ON A CENTERLESS MACHINE

The invention concerns a new detachable cutting plate of polygonal, equilateral, but not equiangular, shape, designed to be mounted radially on a rotary multi-tool head for centerless descaling of rough-drawn or rough-rolled materials.

The term "main cutting edge" as used hereinafter refers to the edge forming an angle of relief $\theta$ with the axis of the bar to be descaled, and the term "secondary planing edge" refers to the edge forming a zero angle of relief with the same axis (FIG. 1).

Men of the art have long been trying to resolve the technical difficulties encountered during the descaling operation by using tools which can easily be reground, these being obtained either by melting or by powder metallurgy. But the tools had the serious disadvantage of using a very large quantity of noble metal and created considerable difficulties during regrinding, with a constant danger that the profile required for carrying out a descaling operation might not be reproduced. Moreover, tools made in one piece did not allow for the formation of chip-breakers even by shaping on a grinding wheel at the risk of suffering shortening of the tool at each regrinding operation, equivalent at least to the width of the chip-breaker, that is to say some millimeters.

Since that time, men of the art have tried to avoid these disadvantages by replacing the mono-block tool by a detachable polygonal cutting plate described as "disposable." The earliest plates had no chip-breakers. This was a fundamental cause of trouble, resulting in destruction of the edge of the tool due to poor control of the chip during its formation.

It has subsequently been found helpful to provide the plate with a chip-breaking surface of constant section formed right along the working edges of the plate.

Although this last solution did bring an appreciable improvement, men of the art must soon have found that because of the constant radius of curvature and the continuity of the profile over the periphery of the working part of the plate, it resulted in the formation of a single, wide chip of continuous section, and that the edges of the chip which were subjected to two convergent and simultaneous directions of peeling led to malformation of the chip which was highly prejudicial to the durability of the tool.

The above-mentioned disadvantages and inadequacies therefore led applicant to carry out research in this field and to perfect a new cutting plate which would provide a genuine solution to the difficulties which are still being encountered by men of the art.

According to the invention, the new detachable cutting plate, which is equilateral, but not equiangular, and designed for centerless descaling of rough-drawn or rough-rolled materials by radial mounting on a rotary multi-tool head is characterized in that it comprises, along each length, a main cutting edge, a secondary planing edge and a connecting curve, and two adjoining chip-breaking surfaces consisting of separate concave grooves, generated by curves respectively tangent at their lowest point to one and the same directing axis.

The first chip-breaking surface faces the straight part of the main cutting edge, of which the axis directing the surface is parallel with the said edge, and forms a cutting angle $\alpha_1$.

The second chip-breaking surface faces the curved part of the length connecting the main cutting edge to the secondary planing edge has a directing axis perpendicular to the plane bisecting the curved cutting corner and forms a cutting angle $\alpha_2$.

The first chip-breaking surface is located opposite the straight part of the main cutting edge. It is defined by its normal profile in a section perpendicular to the axis directing that surface, the axis being parallel to the cutting edge. It then forms a chip which peels off in a direction substantially perpendicular to the said edge, with a radius of curvature appropriate to it and derived both from the radius of curvature of the said chip-breaking surface and from the cutting angle $\alpha_1$.

The second chip-breaking surface is located opposite the curved part of the edge connecting the main cutting edge to the secondary planning edge. It is defined by a concave surface of which the directing axis is perpendicular to the plane bisecting the curved cutting corner. The directing axis is the axis of the volume of revolution generated by the cutting surface. The intersection of this surface with the plane defined by the main cutting edge and the secondary planing edge gives an arc of a circle concentric with that connecting the main edge to the secondary cutting edge. For this purpose, the chip-breaking surface is generated by substantially elliptical generatrices.

Furthermore, the second cutting surface is also characterized by a cutting angle $\alpha_2$ in the plane bisecting the curved cutting corner defined by the tangent with the profile of the cutting surface in the vicinity of the edge and the radius of curvature of that surface.

Thus, the second chip-breaking surface forms a chip which peels off in the direction of the bisecting plane, with a radius of curvature appropriate to it and derived both from the radius of curvature of the chip-breaking surface and from the cutting angle $\alpha_2$.

The surface defined between (a) the main cutting edge and the secondary planing edge and (b) the extreme edge of the chip-breaking surfaces, known in the art as the "listel," is of an even width over the working area of the cutting edge.

In a first alternative embodiment, the cutting angles $\alpha_1$ and $\alpha_2$ may be identical.

In another alternative embodiment, the two chip-breaking surfaces may be of revolution and characterized by different radii of curvature $R_1$ and $R_2$, in accordance with the previous description. In this case, the two chip-breaking surfaces are defined by arcs of a circle of radii $R_1$ and $R_2$.

In yet another alternative embodiment, the sections of the chip-breaking surfaces in planes perpendicular to the directing axes previously defined are arcs of an ellipse, the curvatures of which are different.

Applicant has also found it desirable for the radius of curvature $R_1$ of the first chip-breaking surface to be smaller than the radius of curvature $R_2$ of the second chip-breaking surface.

In the last alternative arrangement, the sections of the chip-breaking surfaces in a plane perpendicular to the directing axes are combinations of arcs of a circle and straight tangent lines having different depths and widths in the plane Qo containing the cutting edges.

The invention will be understood better from the numbered description which can be given of it from the accompanying drawings. These are given to illustrate the invention and impose no restrictions on it. In the drawings:

FIG. 1 shows the cutting plate in its working position on the bar to be descaled;

FIG. 2 is an enlarged view of the cutting plate;

FIG. 3 is a sectional detail through the first chip-breaking surface substantially in the plane c—c of FIG. 2;

FIG. 4 is a sectional detail through the first chip-breaking surface substantially in the plane a—a of FIG. 2;

FIG. 5 is a sectional detail through the second chip-breaking surface substantially in the plane d—d of FIG. 2;

FIG. 6 is a sectional detail through the second chip-breaking surface substantially in the plane b—b of FIG. 2.

Figure 7:
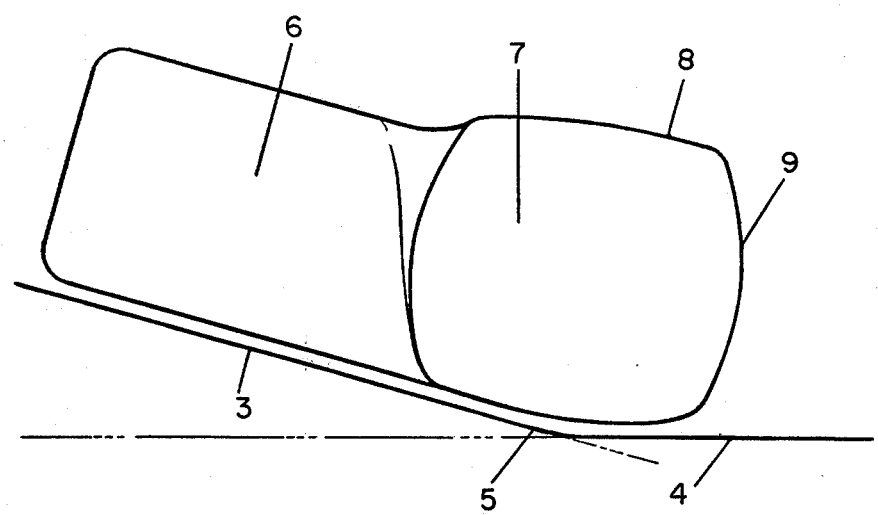
FIG. 7 illustrates an enlarged detail of a cutting plate in accordance with the invention.

Referring now more specifically to the drawings, FIGS. 2, 3, 4, 5, 6 and 7 represent a plate in which the angles $\alpha_1$ and $\alpha_2$ are equal and the chip-breaking surfaces of revolution are characterized by radii $R_1$ and $R_2$, such that $R_1$ is shorter than $R_2$.

In the case of FIG. 1, the arrow 1 reveals the direction of the plate relative to the bar being worked. It should be specified that the actual relative movement between the plate and bar is helical.

The arrow 2 indicates the relative rotation of the plate and bar. Consequently, the combination of movements 1 and 2 determines the formation of a chip.

The angle $\theta$ represents the incidence of the main cutting edge with the axis of the bar being worked.

FIG. 2 shows a cutting plate, according to the invention, of hexagonal, non-equiangular shape, in which 3 is the main cutting edge while 4 is the secondary planing edge and 5 the curve connecting the edges 3 and 4.

The first chip-breaking surface opposite the main cutting edge 3 is represented by 6 and the second chip-breaking surface, located opposite the connecting curve 5, is shown at 7.

FIG. 3, a section of the first chip-breaking surface, reveals the radius of curvature $R_1$ of the cylindrical surface 6 of the chip-breaker, and the cutting angle $\alpha_1$.

FIG. 4 is a section through the same chip-breaking surface in a plane perpendicular to the basic plane Qo and parallel to the edge 3. This section brings out the fact that the generatrix of the chip-breaking surface is parallel with the edge 3.

FIG. 5 shows the radius of curvature $R_2$ of the surface of revolution which forms the chip-breaking surface and the cutting angle $\alpha_2$.

FIG. 6 is also a section through the same chip-breaking surface perpendicular to the basic plane Qo and to the plane bisecting the cutting corner. This figure shows the generatrix of the said chip-breaking surface to be substantially elliptical in shape.

Finally, FIG. 7 shows a cutting plate, according to the invention, of hexagonal, non-equiangular shape, in which the second cutting surface is formed by a substantially elliptical arc 8 with an arc of a curve 9 joined to the ends of it.

Thanks to the presence of the two chip-breaking surfaces, encouraging separate directions of flow for the chips, and thanks to the two different radii of curvature $R_1$ and $R_2$, and possibly two different cutting angles $\alpha_1$ and $\alpha_2$, the cutting plate, according to the invention, consequently ensures that the chip formed will not be straight in cross-section and will have at least one point of inflection, or else that two chips will be formed, thus reducing the amount of energy transmitted by the plate during the formation of the chip while facilitating its peeling, break-up and removal, these three functions taking place in a harmonious manner.

I claim:

1. A detachable cutting plate of polygonal, equilateral, but not equiangular, shape designed for centerless descaling of rough-drawn or rough-rolled materials, by radial mounting on a rotary multi-tool head, and including lengths, each having a main cutting edge having a straight part and a curved part connecting the main cutting edge to a secondary planing edge, said plate characterized in that it comprises along each main cutting edge two chip-breaking surfaces consisting of separate concave grooves, generated by segments of curves respectively tangent at their lowest point to one and the same directing axis;
   a. the first chip-breaking surface facing the straight part of the main cutting edge, of which the axis directing the surface is parallel with the said edge and forming a cutting angle $\alpha_1$;
   b. the second chip-breaking surface facing the curved part connecting the main cutting edge to the secondary planing edge and having a directing axis perpendicular to the plane bisecting the curved part and forming a cutting angle $\alpha_2$.

2. The plate of claim 1 characterized in that the cutting angles $\alpha_1$ and $\alpha_2$ are equal.

3. The plate of claim 1 characterized in that the cross-sections in planes perpendicular to the directing axes are arcs of a circle of different radii of curvature.

4. The plate of claim 1 characterized in that the cross-sections in planes perpendicular to the directing axes are arcs of an ellipse of different curvatures.

5. The plate of claim 1 characterized in that the cross-sections in planes perpendicular to the directing axes are combinations of arcs of a circle and straight tangent lines, the equivalent radii of curvature being different.

6. The plate of claim 1 characterized in that the first chip-breaking surface facing the straight part of the main cutting edge is generated by a straight line parallel with the directing axis.

7. The plate of claim 1 characterized in that the second chip-breaking surface located opposite the curved portion is generated by a curved, substantially elliptical line with its focal axis substantially parallel with its directing axis.

8. The plate of claim 6 characterized in that the second chip-breaking surface located opposite the curved portion is generated by a curved, substantially elliptical line with its focal axis substantially parallel with its directing axis.

9. The plate of claim 7 characterized in that the substantially elliptical arc of the second chip-breaking surface is extended laterally by an arc of a curve, forming the continuous profile of the said chip-breaker.

10. The plate of claim 8 characterized in that the substantially elliptical arc of the second chip-breaking surface is extended laterally by an arc of a curve, forming the continuous profile of the said chip-breaker.

11. The plate of claim 1 characterized in that the listel has a constant width over the useful area of the cutting edge.

12. The plate of claim 8 characterized in that the listel has a constant width over the useful area of the cutting edge.

13. The plate of claim 10 characterized in that the listel has a constant width over the useful area of the cutting edge.

* * * * *